United States Patent
Khemani et al.

(10) Patent No.: US 8,108,608 B2
(45) Date of Patent: Jan. 31, 2012

(54) SYSTEMS AND METHODS OF MAINTAINING FRESHNESS OF A CACHED OBJECT BASED ON DEMAND AND EXPIRATION TIME

(76) Inventors: Prakash Khemani, Bangalore (IN); Prabakar Sundarrajan, Saratoga, CA (US); Lakshmi Kumar, Bangalore (IN); Kailash Kailash, San Jose, CA (US); Ajay Soni, San Jose, CA (US); Rajiv Sinha, San Jose, CA (US); Saravanakumar Annamalaisami, Santa Clara, CA (US)

(*) Notice: Subject to any disclaimer, the term of this patent is extended or adjusted under 35 U.S.C. 154(b) by 733 days.

(21) Appl. No.: 12/020,649

(22) Filed: Jan. 28, 2008

(65) Prior Publication Data

US 2008/0222363 A1    Sep. 11, 2008

Related U.S. Application Data

(62) Division of application No. 11/169,002, filed on Jun. 29, 2005.

(60) Provisional application No. 60/583,784, filed on Jun. 30, 2004.

(51) Int. Cl.
*G06F 12/00* (2006.01)
(52) U.S. Cl. ........................ 711/118; 711/133
(58) Field of Classification Search .............. 711/118, 711/133
See application file for complete search history.

(56) References Cited

U.S. PATENT DOCUMENTS

| | | | | |
|---|---|---|---|---|
| 4,935,870 | A | | 6/1990 | Burk, Jr. et al. |
| 5,511,208 | A | | 4/1996 | Boyles et al. |
| 5,625,793 | A | * | 4/1997 | Mirza .......................... 711/138 |
| 5,657,390 | A | | 8/1997 | Elgamal et al. |
| 5,864,837 | A | | 1/1999 | Maimone |
| 5,881,229 | A | * | 3/1999 | Singh et al. .................. 709/203 |
| 5,893,150 | A | * | 4/1999 | Hagersten et al. ........... 711/139 |
| 5,918,244 | A | * | 6/1999 | Percival ........................ 711/119 |
| 5,925,100 | A | | 7/1999 | Drewry et al. |
| 6,021,470 | A | | 2/2000 | Frank et al. |

(Continued)

FOREIGN PATENT DOCUMENTS

EP    0618708    10/1994

OTHER PUBLICATIONS

Office Action For U.S. Appl. No. 11/169,002, Mailing Date Jun. 22, 2007.

(Continued)

*Primary Examiner* — Matthew Bradley
(74) *Attorney, Agent, or Firm* — Foley & Lardner LLP; Christopher J. McKenna

(57) ABSTRACT

A device that implements a method for performing integrated caching in a data communication network. The device is configured to receive a packet from a client over the data communication network, wherein the packet includes a request for an object. At the operating system/kernel level of the device, one or more of decryption processing of the packet, authentication and/or authorization of the client, and decompression of the request occurs prior to and integrated with caching operations. The caching operations include determining if the object resides within a cache, serving the request from the cache in response to a determination that the object is stored within the cache, and sending the request to a server in response to a determination that the object is not stored within the cache.

20 Claims, 4 Drawing Sheets

U.S. PATENT DOCUMENTS

| | | | |
|---|---|---|---|
| 6,026,413 | A | 2/2000 | Challenger et al. |
| 6,061,715 | A * | 5/2000 | Hawes ..................... 709/203 |
| 6,092,155 | A * | 7/2000 | Olnowich ................... 711/142 |
| 6,192,408 | B1 | 2/2001 | Vahalia et al. |
| 6,363,478 | B1 | 3/2002 | Lambert et al. |
| 6,383,478 | B1 | 5/2002 | Prokop et al. |
| 6,389,462 | B1 | 5/2002 | Cohen et al. |
| 6,442,682 | B1 * | 8/2002 | Pothapragada et al. ......... 713/1 |
| 6,449,695 | B1 * | 9/2002 | Bereznyi et al. ............. 711/134 |
| 6,484,143 | B1 | 11/2002 | Swildens et al. |
| 6,487,641 | B1 * | 11/2002 | Cusson et al. ................ 711/144 |
| 6,507,891 | B1 * | 1/2003 | Challenger et al. ........... 711/122 |
| 6,591,266 | B1 | 7/2003 | Li et al. |
| 6,697,844 | B1 | 2/2004 | Chan et al. |
| 6,697,849 | B1 | 2/2004 | Carlson |
| 6,732,269 | B1 | 5/2004 | Baskey et al. |
| 6,754,699 | B2 | 6/2004 | Swildens et al. |
| 6,785,719 | B1 | 8/2004 | Jacobson et al. |
| 6,789,170 | B1 | 9/2004 | Jacobs et al. |
| 6,820,133 | B1 | 11/2004 | Grove et al. |
| 6,823,374 | B2 | 11/2004 | Kausik et al. |
| 6,826,626 | B1 | 11/2004 | McManus |
| 6,883,068 | B2 * | 4/2005 | Tsirigotis et al. ............. 711/133 |
| 6,920,502 | B2 | 7/2005 | Araujo et al. |
| 6,993,016 | B1 | 1/2006 | Liva et al. |
| 7,024,452 | B1 * | 4/2006 | O'Connell et al. .......... 709/203 |
| 7,028,083 | B2 | 4/2006 | Levine et al. |
| 7,051,161 | B2 * | 5/2006 | Dixit et al. .................... 711/134 |
| 7,055,028 | B2 | 5/2006 | Peiffer et al. |
| 7,113,962 | B1 | 9/2006 | Kee et al. |
| 7,114,180 | B1 | 9/2006 | DeCaprio |
| 7,117,504 | B2 | 10/2006 | Smith et al. |
| 7,155,676 | B2 | 12/2006 | Land et al. |
| 2001/0047406 | A1 | 11/2001 | Araujo et al. |
| 2001/0049741 | A1 | 12/2001 | Skene et al. |
| 2002/0007404 | A1 | 1/2002 | Vange et al. |
| 2002/0032725 | A1 | 3/2002 | Araujo et al. |
| 2002/0107962 | A1 | 8/2002 | Richter et al. |
| 2002/0116582 | A1 | 8/2002 | Copeland et al. |
| 2002/0138511 | A1 | 9/2002 | Psounis et al. |
| 2002/0138572 | A1 | 9/2002 | Delany et al. |
| 2002/0176532 | A1 | 11/2002 | McClelland et al. |
| 2002/0194382 | A1 | 12/2002 | Kausik et al. |
| 2003/0014625 | A1 | 1/2003 | Freed et al. |
| 2003/0018891 | A1 | 1/2003 | Hall et al. |
| 2003/0026241 | A1 | 2/2003 | Ono et al. |
| 2003/0033520 | A1 | 2/2003 | Peiffer et al. |
| 2003/0046586 | A1 | 3/2003 | Bheemarasetti et al. |
| 2003/0046587 | A1 | 3/2003 | Bheemarasetti et al. |
| 2003/0051100 | A1 | 3/2003 | Patel |
| 2003/0065763 | A1 | 4/2003 | Swildens et al. |
| 2003/0093566 | A1 | 5/2003 | Jardin |
| 2003/0105977 | A1 | 6/2003 | Brabson et al. |
| 2003/0115421 | A1 | 6/2003 | McHenry et al. |
| 2003/0140121 | A1 | 7/2003 | Adams |
| 2003/0154239 | A1 | 8/2003 | Davis et al. |
| 2003/0182423 | A1 | 9/2003 | Shafir et al. |
| 2003/0191799 | A1 | 10/2003 | Araujo et al. |
| 2003/0191812 | A1 | 10/2003 | Agarwalla et al. |
| 2003/0200295 | A1 | 10/2003 | Roberts et al. |
| 2003/0217105 | A1 | 11/2003 | Zircher et al. |
| 2004/0003101 | A1 | 1/2004 | Roth et al. |
| 2004/0010621 | A1 | 1/2004 | Afergan et al. |
| 2004/0044731 | A1 | 3/2004 | Chen et al. |
| 2004/0098486 | A1 | 5/2004 | Gu et al. |
| 2004/0128252 | A1 | 7/2004 | Shirai et al. |
| 2004/0162876 | A1 | 8/2004 | Kohavi |
| 2005/0033858 | A1 | 2/2005 | Swildens et al. |
| 2005/0033926 | A1 | 2/2005 | Dumont |
| 2005/0108517 | A1 | 5/2005 | Dillon et al. |
| 2006/0053253 | A1 | 3/2006 | Roth et al. |
| 2006/0059370 | A1 | 3/2006 | Asnis et al. |
| 2006/0064500 | A1 | 3/2006 | Roth et al. |

OTHER PUBLICATIONS

International Search Report, PCT/US05/23914, mailed on May 7, 2007.

International Search Report Written Opinion, PCT/US05/23914, mailed on May 7, 2007.

Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.

International Search Report for PCT/US2005/047435. mailing date Sep. 8, 2006. 5 pages.

Non Final Office Action dated Nov. 21, 2007 for U.S. Appl. No. 11/323,196. 14 pages.

Non Final Office Action dated Jan. 8, 2008 for U.S. Appl. No. 11/324,146. 12 pages.

Final Office Action dated Mar. 17, 2008 for U.S. Appl. No. 11/169,002. 28 pages.

Non Final Office Action, USPTO U.S. Appl. No. 11/323,196. dated May 14, 2008.

* cited by examiner

SYSTEMS AND METHODS OF MAINTAINING FRESHNESS OF A CACHED OBJECT BASED ON DEMAND AND EXPIRATION TIME

CROSS-REFERENCE TO RELATED APPLICATIONS

This application is a divisional of and claims priority to U.S. patent application Ser. No. 11/169,002, filed on Jun. 29, 2005 and entitled "Method and Device for Performing Integrated Caching in a Data Communication Network", which claims priority to U.S. patent application No. 60/583,784, filed Jun. 30, 2004 and entitled "Method and Device for Performing Integrated Caching in a Data Communication Network", both of which are incorporated herein by reference in their entirety.

BACKGROUND OF THE INVENTION

1. Field of the Invention

The present invention relates generally to data communication networks. In particular, the present invention relates to a method and device for performing caching of data in a data communication network.

2. Background

The growth rate of network traffic continues to accelerate, albeit not quite at the exponential rates of the late 1990's. This expanding pace puts strains on the infrastructure that carries that traffic. Various solutions have arisen to permit network operators to handle this increasing problem, including the development of caching technology. With caching, content may be reused and served to clients without burdening server infrastructure. Additionally, caches can permit content to be placed closer to the end user thereby improving response time while also reducing server infrastructure burden.

Caching works by monitoring object requests made by one or more clients to a server on a network and saving the result of such request or requests in the storage of an appliance on the network. Subsequent requests for that same object are intercepted by the cache which delivers the object from its storage rather than passing the request on to the origin server. In this manner, caching provides the dual benefit of lowering response times and lowering the load on the server infrastructure.

However, as the Internet has expanded, multiple modes of processing data have developed to provide various performance, security and other benefits to network traffic. These modes of processing, however, have limited the effectiveness and performance capabilities of caches. Caches traditionally are not able to handle or process the variety of forms that data can take in the ever more complex and processed network environments and therefore the function and usefulness of such caches are commensurately limited.

Traditionally, caches have also been limited by virtue of being unable to serve to users that must be authenticated and/or authorized by the network prior to the delivery of content to such user. Authentication and authorization features have not been part of cache functionality.

Additional limitations of caches have included the inability to process and cache Hypertext Transfer Protocol over Secure Sockets Layer (HTTPS) traffic. Traditional caches have no way of decrypting, comprehending or processing encrypted traffic and therefore are unable to cache any HTTPS object or to provide end-to-end encryption for cached objects.

Furthermore, the ability of the cache to work with other network services and technologies including load balancing technology and other types of acceleration and packet processing has been less then optimal. The problem arises because of processing duplications and other inefficiencies introduced by traditional modes of integration that typically require multiple memory copies and frequent context switching to effect the integration.

The traditional approach to integrating a cache with other types of network processing usually involve placing multiple products in a line so that each function is carried out at a separate and independent node. This approach introduces considerable additional processing and a number of other inefficiencies as described below. Even if the technologies are combined within the same product, the combination is usually implemented in such a way that the benefits of caching when integrated with any other processing are diminished in the process of integration. The limitation of such integration arises as a result of the excess processing, copying and context switching involved in making these technologies work together.

The excess copying and switching results from the fact that each request or object must first be copied into a new form in the processor memory space by the application. The copying into memory space is performed in order to enable the additional processing (such as encryption/decryption, compression, connection offload or any other type of processing) to be carried out. The request or object must then be copied back to the packet level prior to being processed by the cache itself. Each additional type of processing generally requires packet copying to processor buffers, processing by the application and then copying back out for service by the cache. This approach to process integration therefore introduces multiple additional memory copies putting additional and unnecessary burdens upon the network infrastructure. An embodiment of the present invention minimizes this switching of contexts and duplicative processing as will be described below.

SUMMARY OF THE INVENTION

In order to achieve maximum performance, a device in accordance with an embodiment of the present invention efficiently integrates caching with the processing of one or more of (1) Secure Sockets Layer (SSL) encryption/decryption; (2) compression; (3) packet processing; (4) load balancing; (5) Transmission Control Protocol (TCP) buffering; (6) Authentication, Authorization and Auditing (AAA), (7) defense against distributed denial of service attacks (8), defense against HTTP/S based attacks such as Nimda, Code-Red, MyDoom etc., (9) offload of network processing, and (10) other processing, such as techniques to protect networks from network based viruses or attacks.

In particular, a device in accordance with an embodiment of the present invention integrates the foregoing technologies at the operating system (OS) or kernel level of the device rather than in the user/application level as a process or module. By integrating the cache features at this level of the computational structure and hierarchy, an embodiment of the present invention can much more efficiently synchronize caching processes with other processing of the connections to be carried out by or at the appliance including SSL decryption and end point processing, as well as the various others mentioned herein or otherwise carried out at the appliance. Such other processes can also include, in addition to each of the processes described above, connection processing, global server load balancing (GSLB), Hypertext Transfer Protocol (HTTP) compression, TCP compression, defenses against TCP and HTTP distributed denial of service attacks, HTTP virus defense scanning, and the like.

By integrating the variety of network processing and the caching at the OS or kernel level, an embodiment of the invention greatly increases the efficiency of such integration. Working in the kernel space, an embodiment of the invention enables the cache to relate to a relevant object or request as a data structure where the cache maintains equal status to such data structure as each of the other applications. By carrying out tight integration in the kernel/OS space, the cache is also able to see the semantics/data structure of an HTTP or HTTPS request and to make more efficient caching decisions as a result of having access to such data structures. An embodiment of the present invention thereby avoids the problems of context switching and duplication associated with integrating in the more obvious, traditional approach of running a process in the user space.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
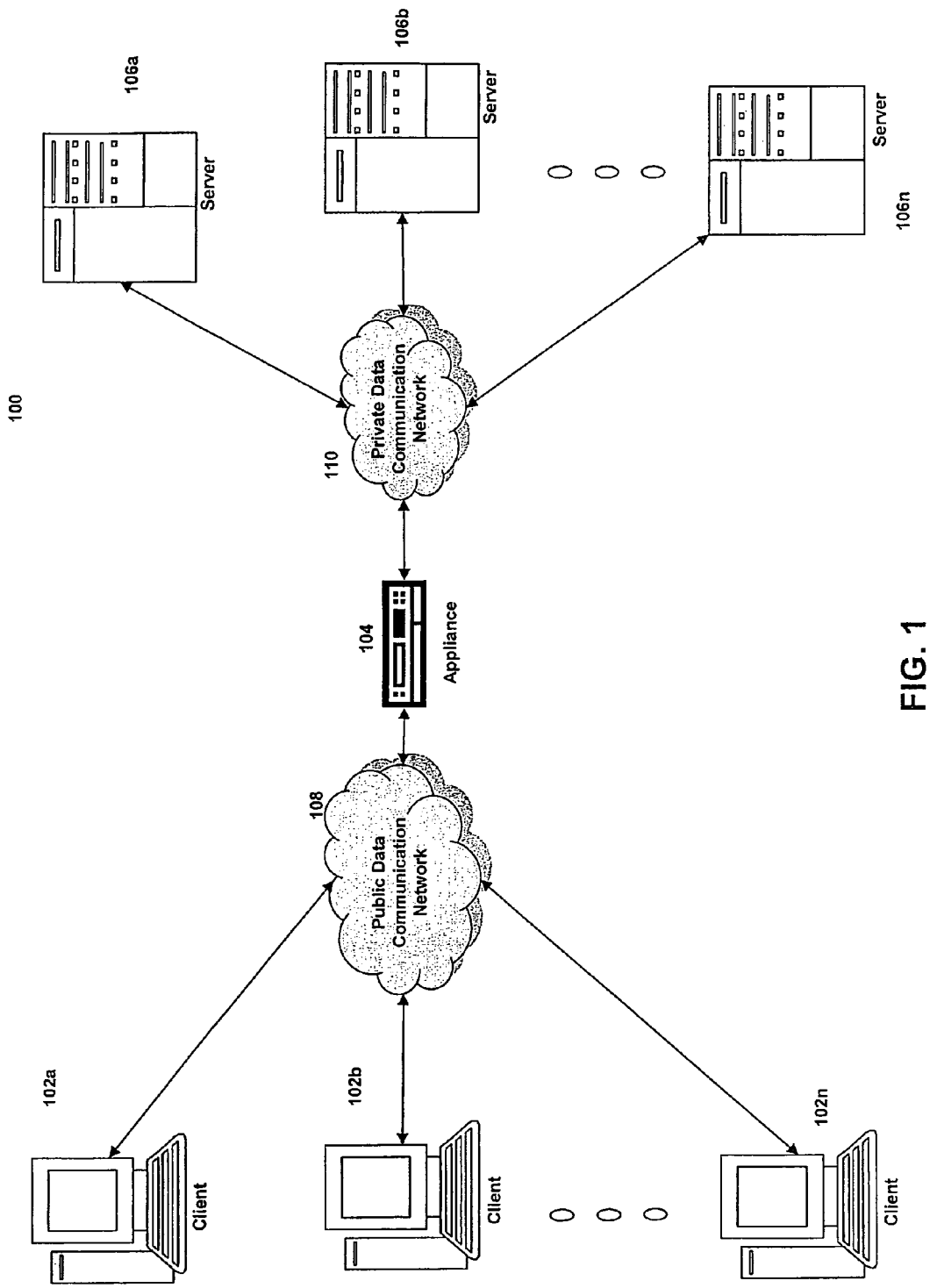
FIG. 1 illustrates an example data communication network environment in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Data Communication Network Environment

FIG. 1 illustrates an example data communication network environment 100 in which an embodiment of the present invention may be implemented. As shown in FIG. 1, example data communication network environment 100 includes a plurality of clients 102a-102n, an appliance 104, and a plurality of servers 106a-106n. Each of clients 102a-102n are communicatively coupled to appliance 104 via a public data communication network 108, while appliance 104 is communicatively coupled to servers 106a-106n via a private data communication network 110. In an embodiment, public data communication network 108 comprises the Internet and private data communication network 110 comprises an enterprise network, although the invention is not so limited.

In accordance with an embodiment of the present invention, appliance 104 includes cache management logic and also includes or has access to a storage medium which it utilizes to implement a cache. Using these features, appliance 104 monitors object requests made by clients 102a-102n to any of servers 106a-106n. Objects returned from servers 106a-106n in response to these object requests are stored in the cache by appliance 104. Subsequent requests for the same object from any of clients 102a-102n are intercepted by appliance 104, which attempts to deliver the object from the cache rather than passing the request on to servers 106a-106n. This provides the dual benefit of reducing both the time required respond to requests from clients 102a-102n and the load on the infrastructure supporting servers 106a-106n.

As will be described in more detail herein, in an embodiment of the present invention, appliance 104 integrates this caching functionality at the operating system (OS)/kernel level of its software architecture with one or more other processing tasks, including but not limited to decryption, decompression, or authentication and/or authorization.

Example network environment 100 is presented by way of example only and is not intended to be limiting. Based on the teachings provided herein, persons skilled in the relevant art(s) will readily appreciate that the present invention may be implemented in any network environment in which object requests and responses are transferred between network nodes.

Figure 2:
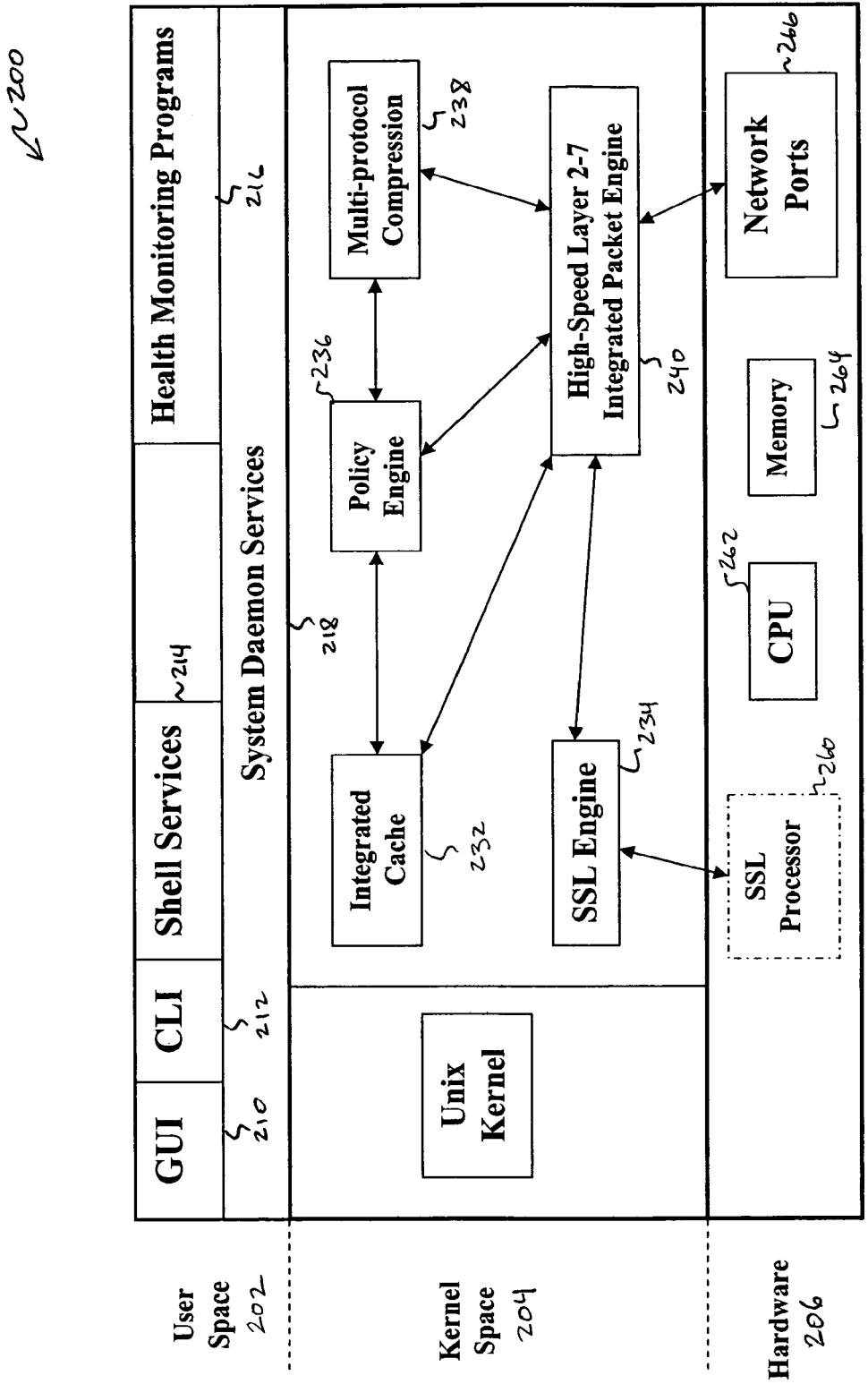
FIG. 2 illustrates an example software architecture of an appliance that performs integrated caching in accordance with an embodiment of the present invention.

B. Integrated Caching in a Data Communication Network in Accordance with an Embodiment of the Present Invention FIG. 2 illustrates an example software architecture 200 of appliance 104. Software architecture 200 is provided by way of illustration only and is not intended to be limiting. As shown in FIG. 2, example software architecture 200 consists of a hardware layer 206 and a software layer divided into a user space 202 and a kernel space 204.

Hardware layer 206 provides the structures upon which programs and services within kernel space 204 and user space 202 are executed. Hardware layer 206 also provides the structures which allow programs and services within kernel space 204 and user space 202 to communicate data both internally and externally with respect to appliance 104. As shown in FIG. 2, hardware layer 206 includes at least a central processing unit (CPU) 262 for executing software programs and services, a memory 264 for storing software and data, network ports 266 for transmitting and receiving data over a network, and an SSL processor 260 for performing functions related to Secure Sockets Layer processing of data transmitted and received over the network.

The operating system of appliance 104 segregates the available system memory into kernel space 204 and user space 204. In example software architecture 200, the operating system is depicted as a Unix operating system although the invention is not so limited. Kernel space 204 is strictly reserved for running Unix kernel 230, device drivers and any kernel extensions. In accordance with an embodiment of the present invention, kernel space 204 also includes a number of network services or processes working in conjunction with an integrated cache 232, the benefits of which are described in detail elsewhere herein.

As shown in FIG. 2, kernel space 204 includes at least a high-speed layer 2-7 integrated packet engine 240, an SSL engine 234, a policy engine 236 and multi-protocol compression logic 238. High speed layer 2-7 integrated packet engine 266 is responsible for managing the kernel-level processing of packets received and transmitted by appliance 104 via network ports 266. To this end, high speed layer 2-7 integrated packet engine 266 works in conjunction with SSL engine 234, integrated cache 232, policy engine 236 and multi-protocol compression logic 238. In particular, SSL engine is configured to perform SSL processing of packets, policy engine 236 is configured to perform functions related to traffic management such as request-level content switching and request-level cache redirection, and multi-protocol compression logic 238 is configured to perform functions related to compression and decompression of data. Integrated cache 232 is configured to perform an integrated caching function as described elsewhere herein.

In contrast to kernel space 204, user space 202 is the memory area used by all user mode applications. A user mode application cannot access kernel space 204 directly and must use service calls in order to access kernel services. As shown in FIG. 2, user space 202 of appliance 104 includes at least a graphical user interface (GUI) 210, a command line interface (CLI) 212, shell services 214, health monitoring programs 216, and daemon services 218. GUI 210 and CLI 212 provide a means by which a system administrator can interact with and control the operation of appliance 104. Health monitoring programs 216 are used to ensure that network systems are functioning properly and that users are receiving requested content over a network. Daemon services 218 are programs that run continuously and handle periodic service requests received by appliance 104. Each daemon program forwards the requests to other programs (or processes) as appropriate.

Figure 3:
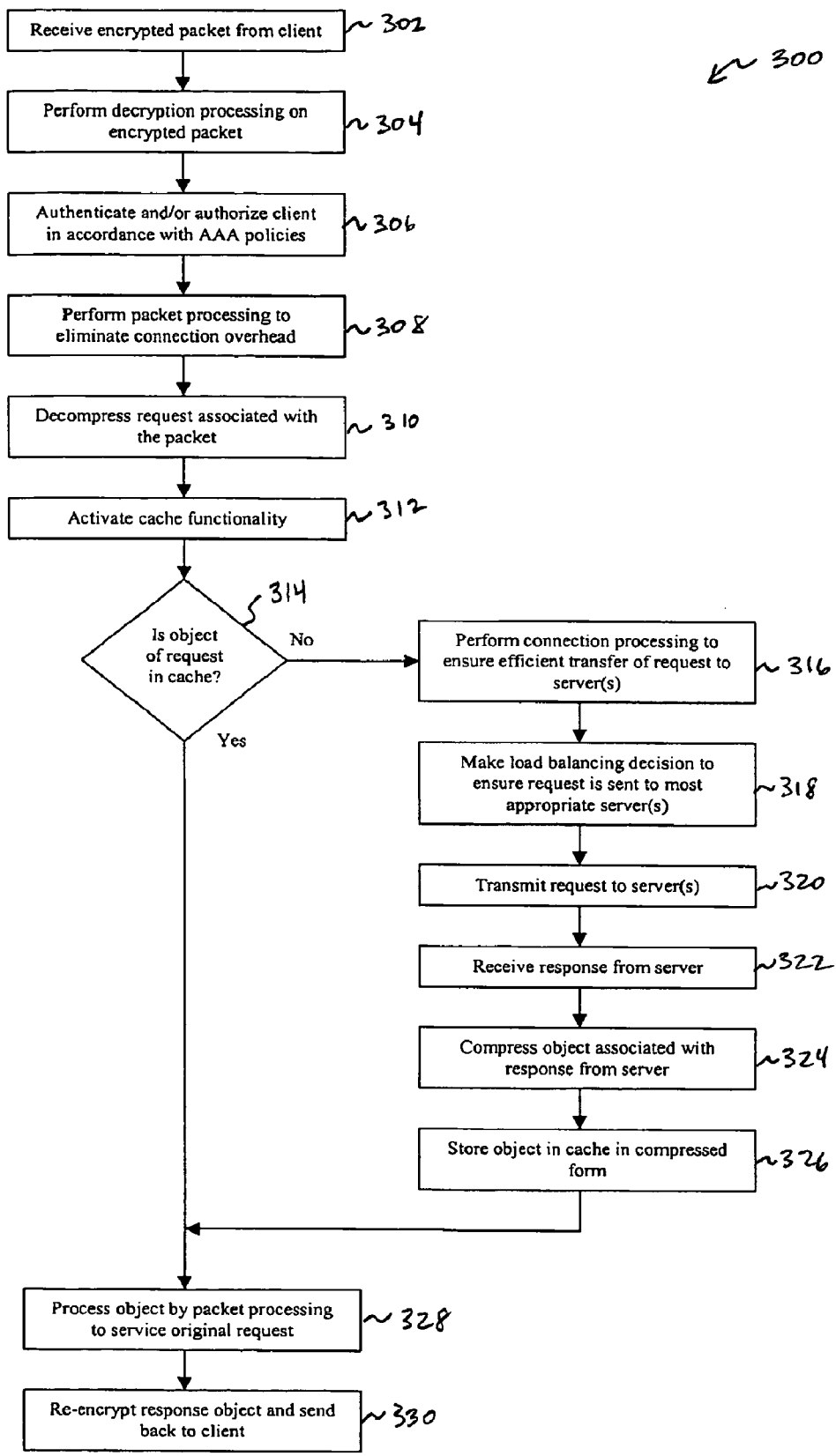
FIG. 3 illustrates a flowchart of a method for performing integrated caching in a device in accordance with an embodiment of the present invention.

FIG. 3 illustrates a flowchart 300 of a sequence of events that may occur in an appliance that provides integrated caching functionality in accordance with an embodiment of the present invention. However, the invention is not limited to the description provided by the flowchart 300. Rather, it will be apparent to persons skilled in the relevant art(s) from the teachings provided herein that other functional flows are within the scope and spirit of the present invention. These other functional flows could involve different processing, different sequencing and other variations on the integration of caching that is the subject of the present invention.

The method of flowchart 300 can be implemented in one or more device(s) that are communicatively coupled to a data communication network. For example, the method of flowchart 300 can be implemented in an appliance such as appliance 104 described above in reference to FIG. 1, having a software architecture 200 as described above in reference to FIG. 2. The method of flowchart 300 will be described with continued reference to this exemplary embodiment, although the invention is not so limited.

As shown in FIG. 3, the method of flowchart 300 begins at step 302, in which appliance 104 receives an encrypted packet from one of clients 102a-102n. In an embodiment, appliance 104 is configured to act as a proxy SSL endpoint for servers 106a-106n, decrypting encrypted packets received from clients 102a-102n, and then sending them on for further processing as necessary and ultimately on to an appropriate resource based on address information within the encrypted packets. The appropriate resource may be, for example, any of servers 106a-106n or the cache managed by appliance 104. At step 304, appliance 104 performs decryption processing on the packet.

At step 306, appliance 104, which is configured in accordance with an embodiment of the present invention to carry out AAA policies for access control, authenticates and/or authorizes the client from which the encrypted packet was received.

At step 308, appliance 104, which is configured in accordance with an embodiment of the present invention to perform certain types of packet processing, carries out packet processing on the decrypted packets to reduce the connection overhead processing requirements generated by the applicable network protocols.

At step 310, appliance 104, which is configured in accordance with an embodiment of the present invention to compress and decompress content, decompresses a request associated with the packet. In an embodiment, the request comprises a web object request, although the invention is not so limited.

At step 312, appliance 104 is then able to activate the cache functionality, which receives a clear and/or authorized and/or decompressed and/or packet-processed request for an object. Because of the prior processing described in reference to steps 302, 304, 306, 308 and 310, the cache management logic can make a decision as to whether the object has been cached or is cacheable based on a clear/authorized/decompressed/packet processed request and is therefore able to process a much wider array of requests then traditional caches and to carry out the caching more efficiently than under traditional approaches. Furthermore, because the cache management logic is working in the kernel space along with the other processes, it relates to the relevant object as a data structure with equal status in relation to such data structure as each of the other applications and therefore the integration is carried out in an extremely efficient manner.

As shown at step 314, if the object is not already in the cache memory, appliance 104 sends a request on to one or more of servers 106a-106n. Before the request is sent, however, several additional processing steps may occur. For example, at step 116, appliance 104 optionally performs connection processing to ensure efficient transit of the request to the server(s) and at step 118, appliance 104 optionally makes a load balancing decision to ensure that the request is sent to the most appropriate server(s). Also, in an embodiment, the request is encrypted before it is sent to the server(s) via a back-end encryption process, thereby providing end-to-end network security. At step 320, the request is transmitted to the server(s)

At step 322, appliance 104 receives a response back from one of servers 106a-106n. If back-end encryption is supported as discussed above, appliance 104 decrypts the response from the server.

At step 324, appliance 104 compresses an object associated with the response from the server. In an embodiment, the object comprises a web object, although the invention is not so limited.

At step 326, the cache management logic in appliance 104 stores the object in the cache in compressed form. The cache management logic is able to store compressed objects in this fashion due to the processing abilities of the present invention. Once the object is stored in the cache, future client requests for the object can be served from the cache without performance of steps 316, 318, 320, 322, 324 and 326 as described above. This is indicated by the line directly connecting decision step 314 to step 328 in flowchart 300.

At step 328, after the object has been received from a server or retrieved from the cache, appliance 104 performs packet processing on the connection to more efficiently service the original client request. At step 330, the response object is then re-encrypted and delivered back to the client.

Each of the processing steps described above occurs at the kernel/OS level of appliance 104. By implementing the cache in the middle of, and integrated with, other processing steps in the kernel/OS space, an embodiment of the present invention is able to bring out additional functionality and improve performance of the cache.

Such integration permits a cache implementation in accordance with an embodiment of the invention to perform additional functions that are traditionally beyond the functional abilities of a cache. For example, an embodiment of the present invention permits the cache to work with encrypted and/or compressed objects.

Another example of additional functionality that may be achieved by an embodiment of the present invention involves the caching of end-to-end encrypted HTTPS traffic. Typically, caches only store unencrypted HTTP responses from servers. Certain caches may in some cases support SSL encrypted HTTPS delivery from the cache to the clients but, in any case, traditional caches are not able to cache responses that have been encrypted by the server and so are unable to support end-to-end (i.e. server to client) encryption. Typically, when a response is encrypted by the server in the form of HTTPS, the cache is not able to decrypt such a response and is therefore unable to store the response in its cache memory. For this reason, traditional caches fail to provide any benefit in the face of end-to-end encrypted traffic. In an embodiment of the present invention, the integrated caching appliance serves as a two-way termination point for the SSL encrypted HTTPS traffic.

For example, in a embodiment of the present invention, the integrated caching appliance acts as a termination point both to encrypted traffic between the server and the appliance, and between the appliance and the clients. In this manner, the appliance is able to decrypt and cache HTTPS-encrypted responses received from servers and when serving such responses to a client, re-encrypt such response and securely deliver it to the requesting client, thereby enabling end-to-end encryption and thus increasing the applicability of caching to a wider variety of web traffic.

In an embodiment of the present invention, the appliance can also serve as an endpoint in an SSL virtual private network (SSL VPN). In particular, the appliance can act as a proxy SSL endpoint for any resource in a private data communication network, decrypting encrypted packets received from a client and then sending them on to the appropriate destination server resource based on address information within the encrypted packets. As described in commonly-owned co-pending U.S. patent application Ser. No. 11/039,946 entitled "System and Method for Establishing a Virtual Private Network," filed on Jan. 24, 2005, the entirety of which is incorporated by reference herein, a data communication session established between client and a gateway may be encrypted with the gateway serving as an encryption endpoint as described in the preceding paragraphs of the present application.

As described in the referenced application, the client may use Secure Sockets Layer (SSL), IPSec, or some other encryption method to establish the encrypted data communication session by which an interception mechanism on the client directs traffic to the gateway while making the client browser think it is communicating directly with the destination servers or destination networks. In such an embodiment, the encrypted data communication session can be terminated at the gateway, which also includes an integrated cache as described herein. In this way caching functionality can be integrated into the SSL VPN functionality.

The gateway can also perform any applicable AAA policies to the request and consequently, the gateway will serve cached objects only to appropriately authenticated clients, as well as permitting requests only for users authorized to access a particular cached object. This is possible because the cache is integrated in such a way that the access control policies of the gateway are enforced before the cache sees any particular request. Thus, cached objects get the benefit of access control without the cache itself needing to perform the authentication and authorization.

Through the integration of the cache with such other functions, the cache itself becomes more efficient and more effective at handling the variety of data that passes across today's networks. An embodiment of the present invention also is able to improve the efficiency of the overall network performance by introducing the benefits of cache functionality to a broader array of web traffic.

Some other unique results of the mode of integration described above in accordance with an embodiment of the present invention are as follows. One result is the ability to cache pre-compressed data and serve it to compression-aware clients. Another result is the ability to cache access-controlled data. Yet another result is the ability to work with external caches to provide scalability of the cache. Because the cache is integrated with redirection and traffic management capabilities at the gateway, external caches can be deployed to provide a second-tier of caching thereby extending the capacity (and the benefits) of caching significantly. Through an embodiment of the present invention, this capacity is created without the cache module itself having to explicitly perform cache redirection policies.

In terms of performance, by integrating the cache as described above, the processors of the cache are freed from performing the variety of connection processing tasks that caches, acting as a nodes on a network, are traditionally required to perform, and are thus able to perform its caching functions at their highest performance levels. Indeed, by enabling the caching of compressed data, the cache is able to function even more efficiently and allow users to realize even higher performance.

As previously noted in this application, the efficiency arises as a result of the way the cache is integrated with the other network services and technologies including load balancing technology, encryption, AAA, compression and other types of acceleration and packet processing. As a result, processing duplications and other inefficiencies introduced by traditional modes of integration are avoided. These inefficiencies, caused by unnecessary copying and context switching, arise because each object received by the device must be copied to a message and then into a processor memory prior to processing by the relevant application. The request must then be copied back to the object or packet level for processing by the cache introducing additional memory copies. In contrast, an embodiment of the present invention carries out the integration at the OS or kernel level, thereby enabling the cache to operate on the object as a data structure where the cache has equal status as the other applications and/or processes in relating to and processing such data structure and where the need for such additional memory copies is obviated as all processes are working with the same data structures. The result is a more efficient integration.

C. Caching with Proactive Validation in a Data Communication Network in Accordance with an Embodiment of the Present Invention Because web objects can change over time, each potentially cacheable object is said to have a useful life, or "freshness". The concept of freshness refers to the fact that the application server that originally generated the content also determines the period of time that such object can be served by a cache that may store such object. Caches must be able to determine whether or not the copy of an object stored in its memory is still "fresh," or whether the cache needs to retrieve a new copy of the object from the origin server. An embodiment of the present invention implements a novel approach to assuring object freshness.

Many conventional cache implementations try to keep the cached content fresh by fetching the content from the origin on a pre-determined schedule. The fetching of content from the origin occurs at times established by the cache administrator typically based on one or both of the following approaches: either at (i) regular specified intervals or (ii) when the content is about to expire.

There are two problems typically associated with the above commonly-employed approaches. First, unnecessary processing loads are imposed upon the origin server because that server is required to provide content to the cache requesting the refreshment (whether such refresh occurs at specified intervals or as the content is about to expire) without regard to whether such content will ultimately be served to clients. Second the cache incurs additional processor load based on the extra processing overhead generated because the cache needs to keep track of the elements that must be refreshed and the time at which they have to be refreshed.

A cache in accordance with an embodiment of the present invention solves the above problems using a novel pre-fetching approach. The pre-fetching of the content is not performed in accordance with a predefined schedule or just prior to expiration of the content. Instead, an embodiment of the present invention performs pre-fetching only when both of the following conditions have been met: (1) a client has made a request for the specified content and (2) that content is 'about to expire'.

This approach addresses both problems described above. Pro-active revalidation is more likely to generate a request for refreshing of content from the origin server only where such content is being actively accessed. This minimizes the amount of unnecessary load on the origin server. As discussed above, where the cache requests refreshment of objects that are not ultimately served to clients (or only rarely get served depending on the sensitivity of the cache), the cache is inefficiently utilizing both its own resources as well as the resources of the origin server. An embodiment of the present invention avoids the inefficient use of the cache and server resources by requesting only that content that is being actively accessed. The approach also, for the same reason, reduces the bandwidth used for pre-fetching and therefore makes more efficient use of network resources than traditional approaches.

Furthermore, an embodiment of the present invention uses the expiry information included in the cached object itself to determine whether to request refreshment of the object from the origin server. Such expiry information is typically included in the headers of the relevant object. This embodiment thus avoids the inefficiencies of storing any additional information for fetching unlike many traditional approaches which require the cache to keep a table tracking the schedule for refreshment.

Using a 'demand-based' pre-fetching technique also enhances benefits that are inherent to pre-fetching. This technique reduces the number of cache misses for frequently accessed objects since such objects are very likely to undergo pro-active revalidation, just before they expire. This technique can also prevent the surge of traffic to an origin server that can occur when a large response that is in great demand expires. In the traditional approach, all of the requests for such content miss the cache and get sent to the origin server because the cache content has expired. By contrast, in an embodiment of the present invention, the content of the cache memory will generally be refreshed just prior to expiration and therefore the situation where cache misses occur while the cache is refreshing are much less likely to arise.

In an embodiment of the present invention, the aggressiveness of pre-fetching can be controlled through adjusting the length of the duration before the expiry where the content is determined to be about to expire and also the number of client requests required to trigger refreshment by the cache of the relevant object.

D. Optimizing Processing of Large Non-Cacheable Responses Using "Negative Cells" in Accordance with an Embodiment of the Present Invention In accordance with an embodiment of the present invention, the cache recognizes and does not store objects that are above a specified size in order to improve the object hit ratio. Caches typically have limited memory space devoted to storing cached objects and therefore certain responses that exceed allocated memory space are ultimately rejected as non-cacheable and not stored by the cache. With traditional caches, the cache attempts to store the large response in its cache memory and only aborts storing the response once the cache recognizes that the response size exceeds a predefined maximum size. Traditional caches will repeatedly attempt to cache the large response each time a request for such response is received by the cache from the server. In each case, the cache will need to determine that the object is non-cacheable as exceeding the memory space. Thus, this is a manifestly inefficient approach.

In accordance with an embodiment of the present invention, the cache employs an optimization to avoid expending effort in storing such responses. Whenever the cache detects a response that becomes non-cacheable due to response size, it stores a notation regarding the corresponding request in a data structure termed a "negative cell." The notation indicates that the request is non-cacheable. In the future, when a client requests the same object, the request is matched to the notation regarded the first request stored in the data structure. Based on the match, the cache will not try to cache the response and instead the request will completely bypass the cache.

There is no user configuration required for specifying the duration for which a negative cell should remain in the cache. In fact, the users are not even aware that this particular mechanism is being employed. In an embodiment, the cache uses the regular expiry information that it would have employed to cache the big response, to cache the "negative information" about that response.

E. Exemplary Computer System-Based Implementation

The functions of the present invention may be implemented using hardware, software, or a combination thereof and may be implemented in one or more computer systems or other processing systems. For example, FIG. 4 depicts an example computer system 400 that may be utilized to implement a the functions of the present invention.

Figure 4:
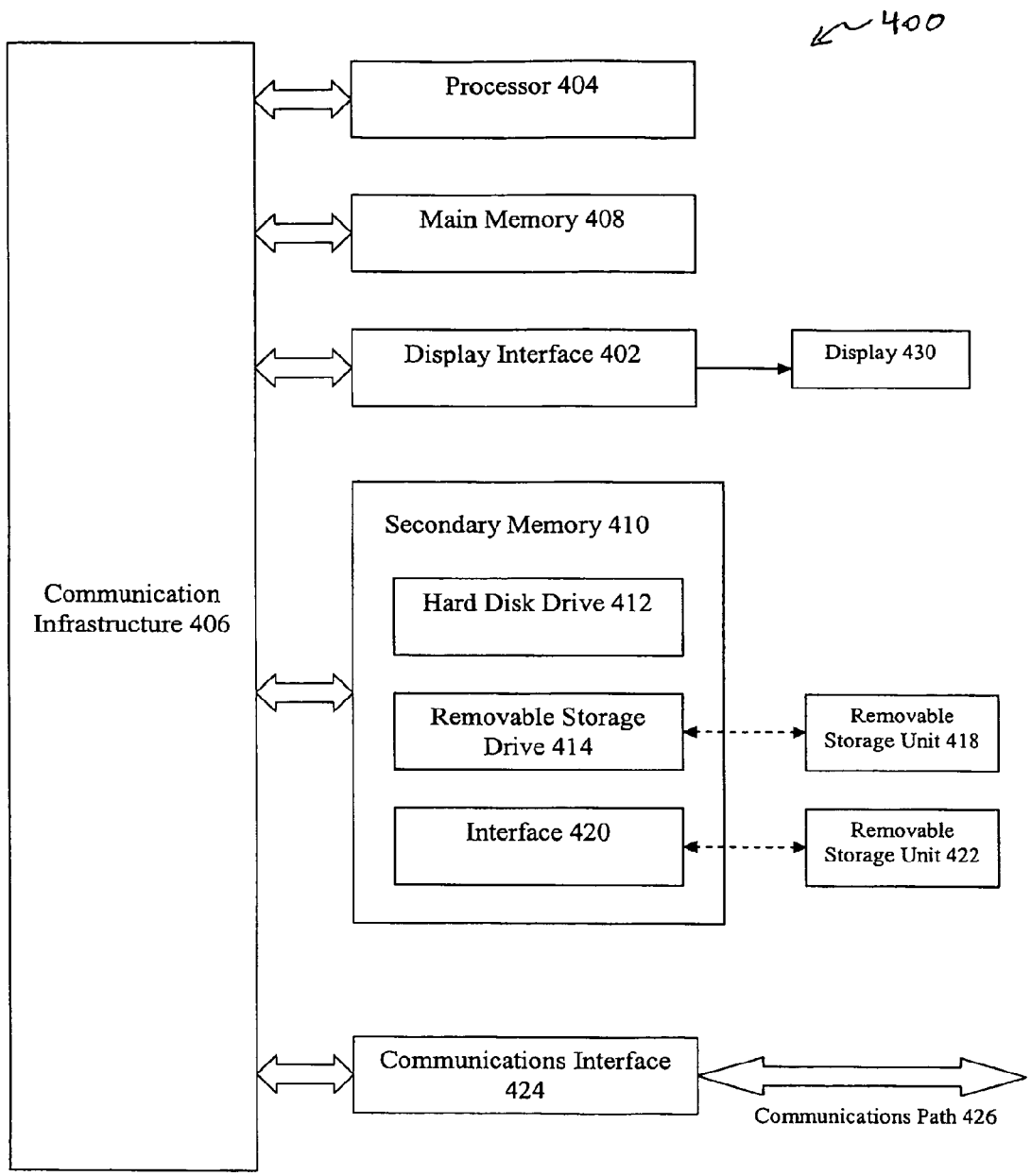
FIG. 4 illustrates an example computer system-based implementation for performing caching functions in accordance with embodiments of the present invention.

As shown in FIG. 4, the example computer system 400 includes a processor 404 for executing software routines in accordance with embodiments of the present invention. Although a single processor is shown for the sake of clarity, the computer system 400 may also comprise a multi-processor system. The processor 404 is connected to a communication infrastructure 406 for communication with other components of the computer system 400. The communication infrastructure 406 may comprise, for example, a communications bus, cross-bar, or network.

Computer system 400 further includes a main memory 408, such as a random access memory (RAM), and a secondary memory 410. The secondary memory 410 may include, for example, a hard disk drive 412 and/or a removable storage drive 414, which may comprise a floppy disk drive, a magnetic tape drive, an optical disk drive, or the like. The removable storage drive 414 reads from and/or writes to a removable storage unit 418 in a well known manner. Removable storage unit 418 may comprise a floppy disk, magnetic tape, optical disk, or the like, which is read by and written to by removable storage drive 414. As will be appreciated by persons skilled in the relevant art(s), the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM, or PROM) and associated socket, and other removable storage units 422 and interfaces 420 which allow software and data to be transferred from the removable storage unit 422 to computer system 400.

Computer system 400 further includes a display interface 402 that forwards graphics, text, and other data from the communication infrastructure 406 or from a frame buffer (not shown) for display to a user on a display unit 430.

Computer system 400 also includes at least one communication interface 424. Communication interface 424 allows software and data to be transferred between computer system 400 and external devices via a communication path 426. In embodiments of the present invention, the communication interface 424 permits data to be transferred between the computer system 400 and a data communication network, such as a public data or private data communication network. Examples of communications interface 424 can include a modem, a network interface (such as Ethernet card), a communications port, and the like. Software and data transferred via communications interface 424 are in the form of signals which can be electronic, electromagnetic, optical or other signals capable of being received by communications interface 424. These signals are provided to the communications interface via the communication path 426.

As used herein, the term "computer program product" may refer, in part, to removable storage unit 418, removable storage unit 422, a hard disk installed in hard disk drive 412, or a carrier wave carrying software over a communication path 426 (wireless link or cable) to communication interface 424. A computer useable medium can include magnetic media, optical media, or other recordable media, or media that transmits a carrier wave or other signal. These computer program products are means for providing software to computer system 400.

Computer programs (also called computer control logic) are stored in main memory 408 and/or secondary memory 410. Computer programs can also be received via communications interface 424. Such computer programs, when executed, enable the computer system 400 to perform one or more features of the present invention as discussed herein. In particular, the computer programs, when executed, enable the processor 404 to perform features of the present invention. Accordingly, such computer programs represent controllers of the computer system 400.

The present invention can be implemented as control logic in software, firmware, hardware or any combination thereof. In an embodiment where the invention is implemented using software, the software may be stored in a computer program product and loaded into computer system 400 using removable storage drive 414, hard disk drive 412, or interface 420. Alternatively, the computer program product may be downloaded to computer system 400 over communications path 426. The software, when executed by the processor 404, causes the processor 404 to perform functions of the invention as described herein.

G. Conclusion

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method for an appliance to efficiently process a response comprising a non-cacheable object exceeding a predefined storage size of the object in a cache, the method comprising the steps of:
    (a) receiving, by an appliance, an object having a size;
    (b) detecting, by the appliance, the size of the object exceeds a predetermined size for storing objects in the cache;
    (c) storing, by the appliance in response to the detection, a notation in the cache indicating the size of the object exceeds the predetermined size;
    (d) receiving, by the appliance, a first request from a client for the object from a server;
    (e) determining, by the appliance, the object of the first request corresponds to the notation in the cache; and
    (f) transmitting, by the appliance in response to the determination, the first request to the server.

2. The method of claim 1, comprising receiving, by the appliance, from the server a response to the first request comprising the object, and bypassing, by the appliance, storing the object in the cache.

3. The method of claim 1, wherein step (c) comprises storing, by the appliance, the notation in a data structure in the cache.

4. The method of claim 1, wherein step (c) comprises caching, by the appliance, the notation using the expiry information for the object.

5. The method of claim 1, comprising using, by the appliance, an expiry of the object as the expiry of the notation stored in the cache.

6. The method of claim 5, comprising removing, by the appliance, the notation in the cache upon expiration of the expiry.

7. The method of claim 1, comprising bypassing, by the appliance, the cache transparently to one of the client or a user of the client.

8. The method of claim 1, wherein step (a) comprises detecting, by the appliance, the size of the object from a response to the client from the server.

9. The method of claim 1, wherein the predefined size comprises a maximum size of the object that can be stored in the cache.

10. The method of claim 1, comprising receiving, by the appliance, the object from the server in response to a second request from the client, detecting the size of the object does not exceed the predefined size, and storing the object in the cache.

11. A system to efficiently process a response comprising a non-cacheable object exceeding a predefined storage size of the object in a cache, the system comprising:

means for receiving, by an appliance, an object having a size;

means for detecting, by the appliance, the size of the object exceeds a predefined size for storing objects in the cache;

means for storing, by the appliance in response to the detection, a notation in the cache indicating the size of the object exceeds the predefined size;

means for receiving, by the appliance, a first request from a client for the object from a server;

means for determining, by the appliance, the object of the first request corresponds to the notation in the cache; and means for transmitting, by the appliance in response to the determination, the first request to the server.

12. The system of claim 11, comprising means for receiving, by the appliance, from the server a response to the first request comprising the object, and bypassing, by the appliance, storing the object in the cache.

13. The system of claim 11, wherein the appliance stores the notation in a data structure in the cache.

14. The system of claim 11, wherein an expiry of the notation comprises the expiry of the corresponding object.

15. The method of claim 11, wherein the appliance caches the notation using the expiry information for the object.

16. The system of claim 14, comprising means for removing, by the appliance, the notation in the cache upon expiration of the expiry.

17. The system of claim 11, wherein the appliance bypasses the cache transparently to one of the client or a user of the client.

18. The system of claim 11, comprising means for detecting, by the appliance, the size of the object from a response to the client from the server.

19. The system of claim 11, wherein the predefined size comprises a maximum size of the object that can be stored in the cache.

20. The system of claim 11, comprising means for receiving, by the appliance, the object from the server in response to a second request from the client, detecting the size of the object does not exceed the predefined size, and storing the object in the cache.

* * * * *